United States Patent [19]

Sargent et al.

[11] 4,087,295

[45] May 2, 1978

[54] MECHANICAL AND THERMAL TREATMENT OF STEEL WIRE

[75] Inventors: Michael R. Sargent, Cary; Robert G. Schwartz; John G. Brown, Jr., both of Raleigh, all of N.C.

[73] Assignee: Monsanto Company, St. Louis, Mo.

[21] Appl. No.: 229,515

[22] Filed: Feb. 25, 1972

[51] Int. Cl.² .......................... C21D 1/80; C21D 9/52
[52] U.S. Cl. .................... 148/143; 148/12 B; 148/31
[58] Field of Search .................. 148/153, 143; 29/193; 140/149

[56] References Cited
U.S. PATENT DOCUMENTS

| | | | |
|---|---|---|---|
| 3,217,838 | 11/1965 | Peterson et al. | 188/1 |
| 3,378,999 | 4/1968 | Roberts | 57/139 |
| 3,601,970 | 8/1971 | Roberts | 57/153 |
| 3,605,469 | 9/1971 | Queralto | 72/128 |
| 3,647,571 | 3/1972 | Okamoto | 148/12.3 |

Primary Examiner—W.W. Stallard
Attorney, Agent, or Firm—Howard C. Stanley; James W. Williams, Jr.

[57] ABSTRACT

A process is described whereby steel wire is made into killed twisted strand or cord having essentially no retained tensile, bending or torsional stresses which comprises twisting a plurality of steel wires to form a strand or cord, austenitizing and simultaneously homogenizing the alloy, quenching the homogenized steel strand or cord along a straight path during martensitic transformation to provide a quenched martensitic structure, essentially to the exclusion of retained austenite and, thereafter, tempering the quenched martensite to provide optimum strength and ductility. The twisted strand or cord resulting from the mechanical and heat treatment possesses nearly optimized strength properties of the alloy employed, while having no retained tensile, bending or torsional stresses and is suitable for application in steel reinforced composite and in particular as tire cord.

19 Claims, No Drawings

MECHANICAL AND THERMAL TREATMENT OF STEEL WIRE

FIELD OF THE INVENTION

This invention relates to a process for the mechanical and thermal treatment of steel wire to produce a novel twisted strand or cord having an undeformed tempered martensitic structure as an article of manufacture useful as tire cord.

BACKGROUND OF THE INVENTION

Steel wire strands and cords have long been used as reinforcing elements for tires, hoses and other flexible composite articles. In the last decade the use of steel wire for tire cord has seen significant growth, particularly in Europe, in belt as well as carcass applications. Typically, a steel tire cord is made by cabling a plurality of drawn steel wires to form a strand or cord. The cabling operation involves laying or bending a plurality of wires or strands about a central axis to result in a strand or cord having the desired twist level. The cabling operation as described results in a product having substantial bending stresses retained, which in turn result in a liveliness or tendency of the strand or cord to kink or curve in a helical, spring-like configuration. The retained bending stresses can also be shown by splaying of the wire ends when the twisted strand or cord is cut. To reduce the retained stresses resulting from the cabling operation the strand or cord is customarily "killed" either by back twisting, "stress relieving", or by mechanically killing the cord. Although back twisting, stress relieving, and mechanical killing of the strand or cord serve to reduce liveliness, these treatments are not done without sacrifice of desirable cord properties. In the case of stress relieving, the strand or cord is heated below the critical (austenitic transformation) range for the given alloy. This treatment results in reducing desirable tensile properties, while desirably reducing bending stresses. Mechanical killing, on the other hand, involves plastic deformation of the live strand or cord by sequentially bending the strand or cord over a plurality of rolls. This treatment typically results in scoring and deforming the shape of the steel wire and reducing bending stresses at the sacrifice of desirable wire properties.

DESCRIPTION OF THE INVENTION

The process of the instant invention provides a superior twisted steel strand or cord of undeformed tempered martensite, having essentially no retained elastic stresses and having essentially optimized tensile and mechanical properties for a given alloy. The process comprises twisting a plurality of steel wires to form a strand or cord, heating the twisted strand or cord for a time and at a temperature sufficient to transform the steel alloy to austenite and homogenize the composition, quenching the austenitized and homogenized strand or cord along a straight path during the martensitic transformation to convert the alloy to martensite, essentially absent retained austenite, and thereafter, tempering the twisted martensitic strand or cord.

The steel wire employed according to the instant invention may comprise straight carbon steel or steels having alloyed therewith minor amounts of other materials such as aluminum, chromium, titanium, manganese, silicon, nickel, vanadium, cobalt, cerium, thiorum, niobium, beryllium, molybdenum, boron, tungsten, and the like. The carbon content may vary over the range of steel compositions and has not been found to constitute a critical aspect of this invention. Although the invention is applicable to a wide range of wide diameters, fine diameter wire having circular cross sections and diameters between about 0.5 and 15 mils is particularly preferred.

The wire used according to this invention may be drawn wire, spun wire or wire made by any other process or combination of processes.

Insofar as the twisting operations contemplated by the process of this invention involve the use of twisters of the type normally employed for twisting textile fibers where an actual torque twist is imparted to the wires, it may be desirable or necessary to anneal the wire to increase its ductility by batch or continuous annealing methods prior to twisting in order to avoid torque twist breakage where the wire in its as-drawn or as-spun condition is too brittle to undergo the level of twisting desired in the strand or cord product. Normally this problem of brittleness occurs in high strength steels.

The terms strand and cord are used herein in the conventional sense in that a strand means a plurality of wires combined about a common axis and a cord connotes a plurality of strands combined about a common axis. (Cf. Rubber Age, p, 59, May, 1971)

The actual twisting of strand or cord can be done using standard equipment where a desired plurality of wires are paid off creels to a twister; for example, a ring twister, to impart a desired level or torque twist. A plurality of strands may similarly be twisted in the same or opposite direction to form a cord in the classical S/Z or Z/Z configuration. Twisting wire to cord can also be accomplished in a one-step procedure using more recent methods involving a single creeling operation where stranding and cording is accomplished on a single machine. Insofar as torque twisting in the stranding and cording operations impose greater stresses on the wire, this invention has proved to be particularly useful in the manufacture of strands and cords made under these more severe conditions involving high torque stresses.

Prior to thermal conditioning according to this invention, the twisted strand or cord, however made, is quite lively and must be maintained under tension such that the tendency to curl and kink is avoided. This is usually accomplished by the contraint provided by winding the strand or cord onto bobbins.

The critical features of the thermal conditioning of the strand or cord according to the instant invention can be reduced to metallurgical transformations in the sequence above-indicated with the provision for quenching along a straight path during the martensitic transformation. One of many possible modes for accomplishing the required treatment involves the use of an enclosed chamber having an entrance and an exit for the strand or cord. Such chamber is desirably swept with a protective atmosphere to prevent degradative oxidation of the wire during the thermal conditioning operation. The strand or cord is fed into the chamber from bobbins and passed from a first contact roll within the chamber through a tube to a second contact roll. The initial thermal treatment of this invention involves heating the strand or cord at a temperature and for a time sufficient to austenitize and homogenize the alloy. This has been accomplished by grounding the first contact roll in the chamber while positively charging the second contact roll. The electrical resistance of the wire allows controlled heating to the desired temperature and the distance between the rolls provides the dwell time necessary for homogenization. Between the first and second rolls the strand or cord is passed through a tube which can also be employed to provide a portion of the heat, by convection and/or radiation, to the strand or cord. Although electrical resistance heat can be used as the sole heat source, the use of a heated tube in combination with electrical resistance heating provides a convenient means for more uniform heating insofar as heat is not lost by convection from the surface of the wire and the problem of local hot spots along the length of the strand or cord is reduced. The temperatures and dwell times will vary with the alloy and wire diameter and can be readily established by those skilled in the art. The critical feature of this step involves the described metallurgical transformation. Because the tensile strength of the wire is reduced during the transformation to austenite and at elevated temperatures, care should be taken to avoid excessive tension on the wire during this operation. The strand or cord leaving the second roll is rapidly quenched to provide transformation to martensite, essentially to the exclusion of retained austenite. The time and temperature parameters here also depend on the composition and prior structure of the steel alloy and can be readily defined by those skilled in the metallurgical arts. The quench can be a gas or liquid quench or a combination thereof. We have conveniently quenched the strands and cords by passing the heated strand or cord over a cooled second roll into a water bath, as well as by passing the strand or cord from the cooled second roll to a third roll through a zone swept with helium gas. Other gases or liquids can be employed as long as the conditions are such that the rate of cooling is appropriate to provide the necessary metallurgical transformation. During the quenching step and after the strand or cord leaves the surface of the second roll, quenching through the martensitic transformation should be completed while the strand or cord travels along an essentially straight path to avoid undesirable bends being set in the strand or cord during the quenching operation.

The quenched strand or cord is then tempered to provide a tempered martensitic structure having optimized strength and ductility. Tempering can be accomplished in line by any continuous heating process, for example, by passing the strand or cord from the third roll back over the second roll or by heating the strand or cord in a separate heated zone. After tempering the wire may be passed out of the chamber and may be collected on bobbins or it may be passed along continuously for further processing. For example, the cord can be passed into a coating bath and subsequent curing operations.

Although possible modes of accomplishing the mechanical and thermal steps of this invention are described above in general terms and in detail in several of the Examples below, the essential features of the process of this invention require twisting steel wires to form a strand or cord, continuously austenitizing and homogenizing the twisted strand or cord and then continuously quenching the twisted strand or cord along an essentially straight path during martensitic transformation to a martensitic structure, essentially absent retained austenite and then tempering the as-quenched martensite. The particular conditions for use of the invention for any given alloy are not considered critical and can be determined by those skilled in the art. Moreover, other modes of carrying out the invention will become readily apparent upon consideration of the invention as described.

The process as described above and in the working Examples effectively and completely dispose of tensile, torsional and bending stresses imparted to the wire by the stranding and cording operations, whatever the degree of twist. In other words, the product is completely killed such that an indefinite length, 20 feet for example, will lie without restraint between parallel lines spaced four inches apart. The thermal processing additionally provides a means for optimizing the tensile properties of strength and ductility elongation for any desired alloy without compromise for stress relieving, mechanical deformation, or back twisting.

The unique features of the strand or cord of this invention is that the deformation resulting in tensile, bending and torsional stresses normally imparted to wire in strand or cord form are essentially absent. In other words, strand or cord of this invention, even though twisted, is characterized by an undeformed tempered martensitic structure insofar as the thermal conditioning has, in effect, wiped out the stresses of earlier deformation to provide a product which is, and most desirably, completely killed.

While the process has been described in terms of the essential transformation stages and in terms of a convenient operating mode it may be desirable to incorporate additional steps in the in-line operation of the invention. For example, we have alluded to the fact that high strength steels may be quite brittle in their as-drawn or as-spun condition. The brittle character of the wire may therefore necessitate an annealing step prior to twisting to make the wire more ductile and, therefore, more amenable to twisting.

Another interesting facet of the process of the invention lies in the ability to make a twisted strand or cord of a high carbon steel having an undeformed martensitic structure by twisting a low carbon steel, 1008, for example. This is achieved by twisting wires of a low carbon steel to form the desired strand or cord and thereafter in-line carburizing the strand or cord by passing it through a gaseous hydrocarbon which cracks on the hot wire surface and diffuses carbon into the wire. This step can be combined with the process of this invention to provide a high carbon alloy product of the invention.

The following Examples illustrate specific embodiments of the invention:

EXAMPLE I

A steel alloy having the following composition

| | |
|---|---|
| Carbon | 0.37 ± .03 wt % |
| Aluminum | 1.0 ± 0.1 |
| Manganese | 0.8 ± 0.1 |
| Silicon | 0.25 ± 0.1 |
| Boron | .04 ± .005 |
| Sulfur | —.004 |
| Phosphorus | —.002 | was spun from a molten mass to form continuous wire having a diameter ranging during the run from 3.8 to 4.2 mils. The wire was continuously taken up on bobbins and then rewound onto metal spools which were placed in an annealing oven. The oven was purged with nitrogen and evacuated to remove oxygen and moisture, then heated to 700° C. and held for 2½ hours after which the oven was allowed to cool to ambient temperature in about 24 hours. The spools were removed from the oven and treated with a protective oil coating. Seven of the oiled spools were creeled and fed to a ring twister to form a strand having nominally 4 twists per inch in the Z direction. Four of these strands were then twisted on the ring twister to form a cord having nominally 4 twists per inch in the Z direction. At this point the cord is quite lively and tends to untwist and kink in absence of contraint. The cord was then rewound onto metal spools which were placed in a commercially available ultrasonic cleaner containing hexane to removed oil and, thereafter, dried. The cord thus prepared was continuously passed into an enclosed chamber which had been purged with nitrogen for seven minutes and with nitrogen and helium for three minutes to substantially reduce the oxygen and moisture content. Upon entering the chamber the cord is passed over a first roll at velocity of 100 feet per minute to a water cooled positively driven second roll along a path of about 6 feet through a heated tube 5 feet 7 inches in length having a ½ inches internal diameter heated to 800° C. In combination with the heat supplied by the tube a current of 19.5 amps at 78 volts was placed on the cord between the grounded first roll and the second roll.

Thus, the cord was internally heated by electrical resistance and externally by convection such that the temperature of the cord as it exited from the tube was 1050° C. This treatment provided conditions for austenitic transformation and homogenization of the alloy between the first and second rolls. From the second roll the cord was passed along a straight path to a third roll having same potential as second roll and situated 2 feet distant between which rolls the cord passes through a slot between plates supplied with flowing helium. From the third roll the cord is again passed over the second roll and onto a forth roll having a potential of 6.5 amps 58 volts. The fourth roll is situated 16 feet from the third roll to provide conditions for tempering. From the fourth roll the cord was passed out of the chamber and taken up on plastic bobbins.

The conditions of the experiment described above provide conditions for austenitizing and homogenizing the cord between first and second rolls, martensitic transformation occurred from the second roll to the third roll and thereafter the martensitic cord was tempered between the second and fourth roll. Without further processing the cord was examined and found to be quite limp. A long piece was cut from the take-up bobbin and laid along a straight path. There was no tendency for the cord to curl or otherwise migrate to a configuration other than that of the path in which it was laid. The cut ends showed no tendency to play.

EXAMPLE II

Steel wire having a diameter of nominally 4 mils was annealed in a manner similar to that described in Example I and twisted on a textile twister to form a single large strand of twenty-one wires having 5Z twists per inch. The strand was passed through the enclosed chamber described in Example I at 92 feet per minute under the conditions of Example I except that the austenitizing heat and tempering heat were altered by changing the current between the first and second rolls to 13 amps at 80 volts and that potential on the fourth roll to 5 amps at 70 volts. The strand thus prepared was completely killed and showed no tendency to splay where cut or to curl when laid along a path over ten feet.

EXAMPLE III

Seven wires made by die drawing a 1045 steel alloy to a diamter of 4 mils were twisted on a textile twister to provide a strand having 4Z twists per inch. Four such strands were then twisted together to form a cord wherein the strands were given 3S twists per inch. The lively cord thus prepared was passed through the enclosed chamber described in Example I at the rate of 92 feet per minute. The internal heat in the austenitizing and homogenizing stage was supplied by a current of 13 amps at 88 volts between the first and second rolls. The heat for tempering was provided by a current between the second and fourth rolls where the power input to the fourth roll was 5 amps at 82 volts.

Examination of the cord thus prepared indicated no tendency to splay when cut or to migrate from the straight path when substantial lengths were laid out on a flat surface.

We claim:

1. A method for making twisted steel wire strand or cord having substantially no residual tensile, torsional or bending stresses which comprises, sequentially
    a. twisting a plurality of steel wires to form a twisted strand or cord,
    b. continuously heating the twisted strand or cord above the critical range to austenitize and homogenize the strand or cord structure,
    c. continuously quenching the strand or cord to a quenched martensitic structure, essentially absent retained austenite, and
    d. tempering the quenched martensite.

2. The process of claim 1 wherein the wire is annealed prior to twisting.

3. The process of claim 1 wherein the twisted strand or cord is carburized prior to homogenization.

4. The process of claim 1 wherein the said strand is formed by combining a plurality of wires and twisting the wires at least 2 turns per inch.

5. The process of claim 4 wherein a plurality of said strand are combined and twisted at least 2 turns per inch in a direction opposite the strand twist to provide an S/Z twisted cord.

6. The process of claim 4 wherein a plurality of said strands are combined and twisted at least 2 turns per inch in the same direction as the said strands to provide a Z/Z twisted cord.

7. The process of claim 1 wherein the strand or cord is heated in-line by electrical resistance in steps (b) and (d).

8. The process of claim 1 wherein steps (b) and (c) are conducted in a protective gaseous atmosphere.

9. The process of claim 1 wherein the said steel strand or cord comprises wires of a steel alloy having an initial carbon content of less than about 0.81 percent by weight.

10. The process of claim 9 wherein the said alloy comprises minor amounts of one or more of aluminum, manganese, chromium, silicon, titanium, boron, vanadium, beryllium, nickel, molybdenum, tungsten, cobalt, cerium, thorium, or niobium.

11. The process of claim 4 wherein the said strand or cord is comprised of wires having diameters of less than 15 mils.

12. The process of claim 11 wherein the said wires have diameters of less than 6 mils.

13. The process of claim 1 wherein the said strand or cord is comprised of a pluraity of wires having circular cross-sections of the same diameter.

14. A twisted strand or cord comprising a plurality of steel wires wherein each of said wires is characterized by tempered undeformed martensite structure.

15. The strand of claim 14 comprising a plurality of wires having a twist level of at least 2 twists per inch.

16. A cord comprised of a plurality of the strands of claim 15.

17. The cord of claim 16 wherein the said strands are combined and twisted in a direction opposite the direction of twist of the wires in the said strands.

18. The cord of claim 16 wherein the said strands are combined and twisted in the same direction of the twist of the wires in the said strand.

19. The strand or cord of claim 14 wherein the said alloy contains minor amounts of one or more of aluminum, manganese, chromium, silicon, boron, vanadium, beryllium, titanium, molybdenum, tungsten, nickel, cobalt, cerium, thorium or niobium.

* * * * *